(12) United States Patent
Deguchi

(10) Patent No.: US 6,189,951 B1
(45) Date of Patent: *Feb. 20, 2001

(54) STRUCTURE FOR POSITIONING WEATHER STRIPS

(75) Inventor: Kouzo Deguchi, Hiroshima (JP)

(73) Assignee: Nishikawa Rubber Co., Ltd., Hiroshima (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/950,989

(22) Filed: Oct. 15, 1997

(30) Foreign Application Priority Data

May 26, 1997 (JP) .................................................. 9-152895

(51) Int. Cl.[7] ................................................. B60J 10/08
(52) U.S. Cl. ........................................ 296/146.9; 296/206
(58) Field of Search ................................ 296/146.9, 206, 296/39.1; 49/479.1, 484.1, 489.1, 492.1, 498.1

(56) References Cited

U.S. PATENT DOCUMENTS

| | | | |
|---|---|---|---|
| 4,026,598 | * 5/1977 | Koike | 296/146 |
| 4,229,036 | * 10/1980 | Toda | 296/202 |
| 4,653,802 | * 3/1987 | Watannabe et al. | 296/203 |
| 4,934,101 | * 6/1990 | Hannya et al. | 49/502 |
| 4,969,295 | * 11/1990 | Nishidawa et al. | 49/502 |
| 5,311,702 | * 5/1994 | Moore | 49/495.1 |
| 5,319,883 | * 6/1994 | Gueneau et al. | 49/489.1 |
| 5,356,194 | * 10/1994 | Takeuchi | 296/146.9 |
| 5,649,405 | * 7/1997 | Morihara et al. | 52/716.1 |
| 5,918,421 | * 7/1999 | Nozaki | 49/492.1 |

FOREIGN PATENT DOCUMENTS

| | | |
|---|---|---|
| 82400211 | * 5/1982 | (EP) . |
| 94301485 | * 2/1994 | (EP) . |
| 5-26566 | 4/1993 | (JP) . |
| 5-40018 | 5/1993 | (JP) . |
| 6-39538 | 5/1994 | (JP) . |

\* cited by examiner

*Primary Examiner*—D. Glenn Dayoan
*Assistant Examiner*—Mickki D. Murray
(74) *Attorney, Agent, or Firm*—Frishauf, Holtz, Goodman, Langer & Chick, P.C.

(57) ABSTRACT

A structure for positioning weather strips including a roughly L-shaped weather strip having a seal portion resiliently contacting a door formed integrally therewith. The weather strip is inserted into and attached to a sash which is located at a periphery of an opening of a vehicle body. A single garnish is provided in which no insert metal is internally incorporated. The single garnish is fixed at the sash corresponding to a side of the weather strip. A subseal is attached to the sash corresponding to an upper face of the weather strip in such a state where the subseal is in contact with the weather strip, and a clip is provided for fixing the weather strip at the subseal at a more upper position than a fixing position of the garnish.

4 Claims, 4 Drawing Sheets

STRUCTURE FOR POSITIONING WEATHER STRIPS

FIELD OF THE INVENTION

The present invention relates to a structure for positioning weather strips which is able to seal clearances between a door of a vehicle and a body of the vehicle when the door is closed.

BACKGROUND OF THE INVENTION

As shown in FIG. 5 and FIG. 6, a structure for positioning weather strips according to a conventional example is such that a roughly L-shaped weather strip 1, for in which a sealing portion 1a resiliently contacting a door (not illustrated) is integrally formed, is inserted into and attached to a sash 2 which is located at the peripheral edge of an opening of the vehicle body, wherein a plate-like garnish 3 is fixed at the rear surface of the sash 2 corresponding to the vertical portion of the weather strip 1, and further one end side of a subseal 4 is attached to the surface of the sash 2 corresponding to the upper face of the weather strip 1 in such a state where the same is in contact with the appearance lip 1c of the weather strip 1. FIG. 6 is an enlarged cross-sectional view taken along the line 6—6 of FIG. 5.

Although the fixing position of the garnish 3 with respect to the sash 2 fixed by a fixing screw 6 is determined at a comparatively lower side of the vehicle body as shown in FIG. 5, since an insert metal member 5, is internally incorporated in the garnish 3, there is no problem in terms of damage to the product quality resulting from the upper end of the garnish 3 projecting in the outward direction (X direction in FIG. 6). Therefore, as shown in FIG. 6, it is possible to drill holes for a clip 7 for positioning and retaining at the center of the weather strip 1, and the weather strip 1 is fixed at the subseal 4 and sash 2 by one or more such clips.

However, it is desirable not to use an insert metal member 5 internally incorporated in a garnish 3 in order to decrease the production cost. If no insert metal member 5 is used, the upper end of the garnish 3 is liable to protrude or to be lifted since no reinforcement of the garnish 3 is provided. In order to prevent the upper end garnish 3 from protruding or being lifted, as shown in FIG. 7, a necessity of moving the fixing position of the garnish 3 and sash 2 by a fixing screw 8 to the upper extreme position arises.

Resultantly, a clip 9 which is used for fixing the weather strip 1 at the subseal 4 and sash 2 has been conventionally provided at a lower part position than the position of the fixing screw 8. However, if the clip 9 is positioned at a lower portion, there arises another problem in that the upper end of the appearance clip 1c of the weather strip 1 protrudes inwardly of the vehicle (Y direction in FIG. 7), thereby causing the appearance to be spoiled. Still furthermore, since the weather strip 1 and subseal 4 are unavoidably lengthened by an amount equivalent to the distance of descending the clip 9, the metal dies of the weather strip 1 and subseal 4 have been conventionally made large-sized, thereby causing the production cost to be increased and the moldability thereof to be adversely affected.

SUMMARY OF THE INVENTION

It is an object of the invention to provide a structure for positioning weather strips, by which the protrusion or lifting of the weather strip can be prevented, according to which metal dies can be made small-sized, and which is able to effectively prevent slippage of the weather strip.

It is another object of the invention to provide a structure for positioning weather strips, the rigidity of which is further increased and the adhesivity of which is increased when a weather strip is attached, in addition to the above-mentioned object.

In order to solve the shortcomings and problems described above, a structure for positioning weather strips according to the invention is characterized in that a roughly L-shaped weather strip (11), for in which a seal portion (11a) resiliently contacting a door is intergrally formed, is inserted into and attached to a sash (12) at the periphery of an opening of the vehicle body, a single garnish (13) in which no insert metal member (5) is internally incorporated fixed at the sash (12) corresponding to the side of the weather strip (11), a subseal (14) is attached to the sash (12) corresponding to the upper face of the weather strip (11) in such a state where the same is in contact with the weather strip (11), and simultaneously the weather strip (11) is fixed by a clip (20) at the subseal (14) at a more upper position than the fixing position of the garnish (13).

Furthermore, in a structure for positioning weather strips according to the invention, the subseal (14) is a die-molded member made of solid rubber, has an attaching surface (14a) for a fixing clip formed, and the thickness of the attaching surface (14a) around clip hole (21) provided therein is made larger than an appointed thickness (t).

The numerals in the brackets are shown in the drawings, and show the corresponding elements and parts in the preferred embodiment of the invention described hereinbelow.

With the invention, the fixing position between the weather strip and subseal is not determined at a lower position than the fixing position of the garnish but may be determined at an upper position. Therefore, with a single garnish in which no insert metal member is internally incorporated, it is possible to prevent the upper end of the weather strip from protruding and flapping and to prevent the appearance from being worsened. Furthermore, since the fixing position is determined at an upper position, the structure of the invention is very effective to prevent the weather strip from slipping.

Furthermore, in the conventional examples, since the fixing position between the weather strip and subseal was a lower position than the fixing position of the garnish, a long length of weather strip and subseal was conventionally necessary for this portion. According to the structure of the invention, this is not required anymore. That is, since the length can be shortened, the metal dies can be made small-sized equivalent to the shortening of the length, and the total production cost can be decreased in line with the downsizing of the metal dies. The molding thereof can thereby be facilitated by the downsizing of metal dies.

With the invention, in addition to the above effect and advantages, since the attaching face of a fixing clip of the weather strip is formed, the adhesivity of the clip and subseal can be increased, and the adhesivity of the subseal and a weather strip to be attached to the subseal is further increased. Furthermore, it is possible to prevent the weather strip from slipping. Since the thickness around the clip hole can be kept thicker than an appointed thickness, the rigidity of the subseal can also be increased.

BRIEF DESCRIPTION OF THE INVENTION

In the accompanying drawings

DESCRIPTION OF THE PREFERRED EMBODIMENT

Figure 1:
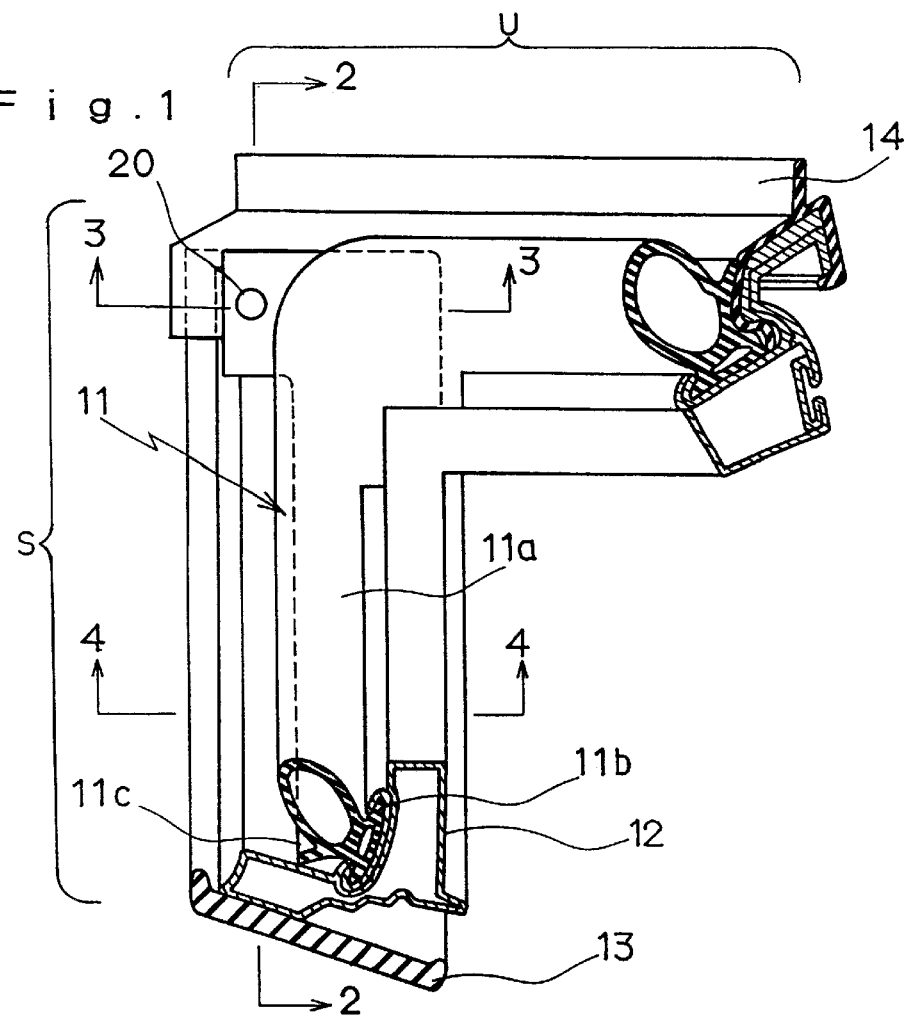
FIG. 1 is a fragmentary perspective view showing a structure for positioning weather strips according to a preferred embodiment of the invention.
Figure 2:
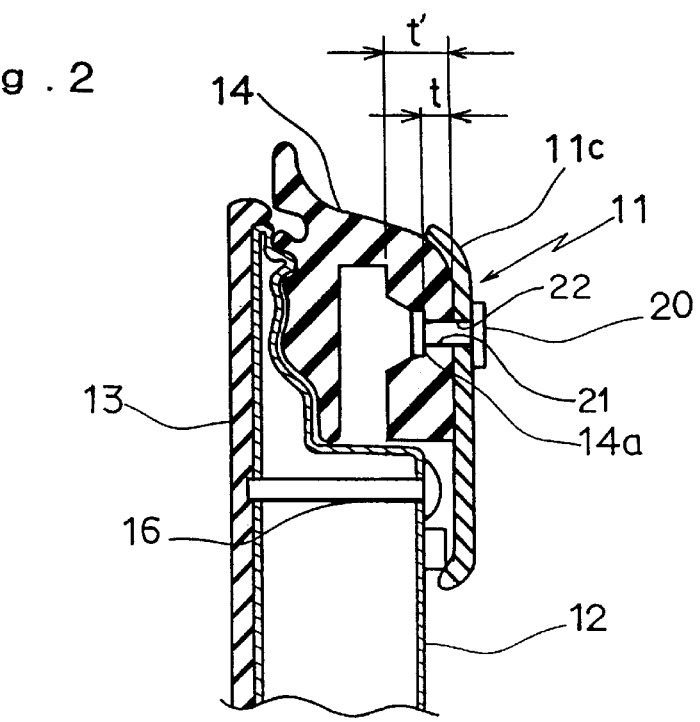
FIG. 2 is an enlarged cross-sectional view taken along the line 2—2 in FIG. 1.
Figure 3:
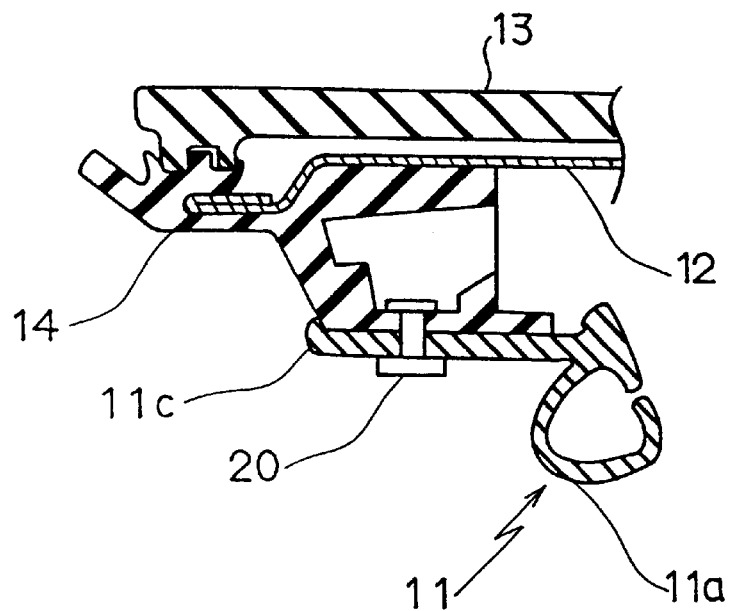
FIG. 3 is an enlarged cross-sectional view taken along the line 3—3 in FIG. 1.
Figure 4:
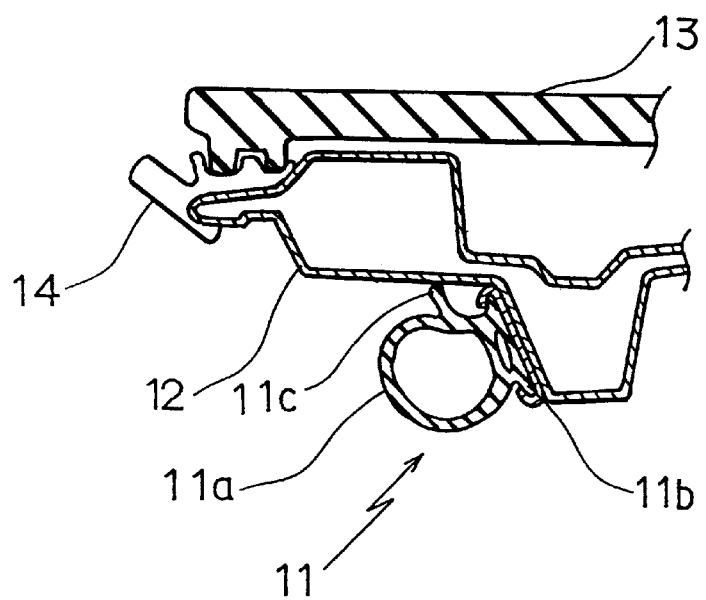
FIG. 4 is an enlarged cross-sectional view taken along the line 4—4 in FIG. 1.
Figure 5:
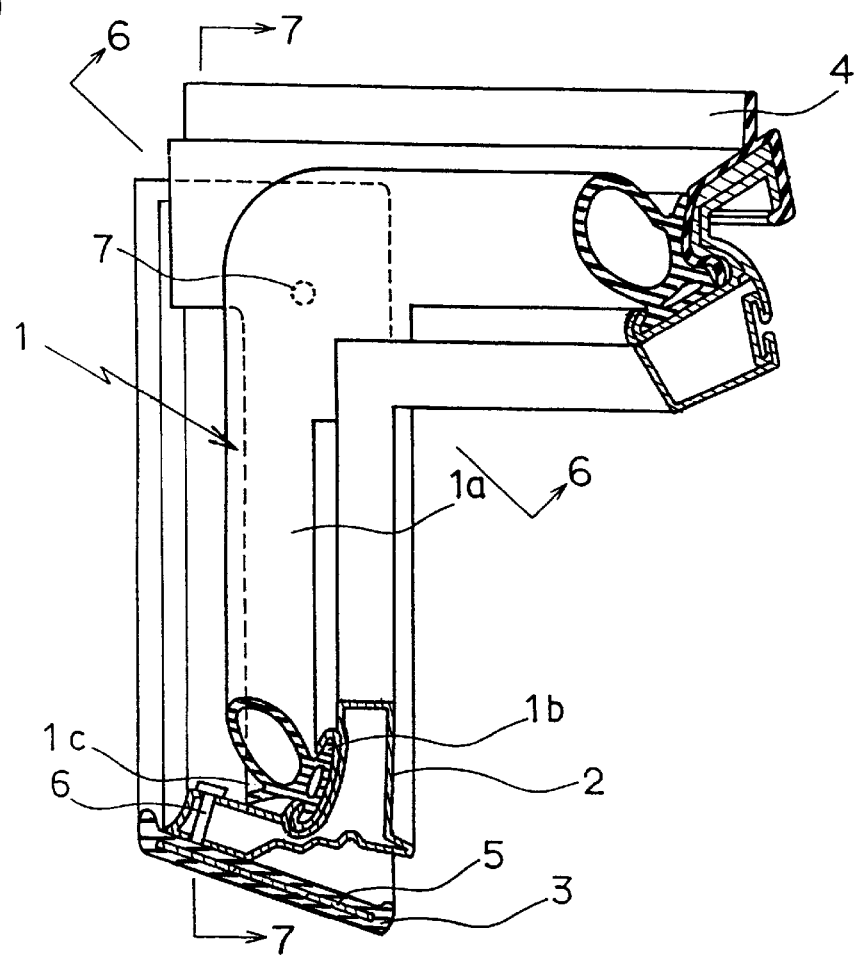
FIG. 5 is a fragmentary perspective view showing a structure for positioning weather strips according to a conventional example.
Figure 6:
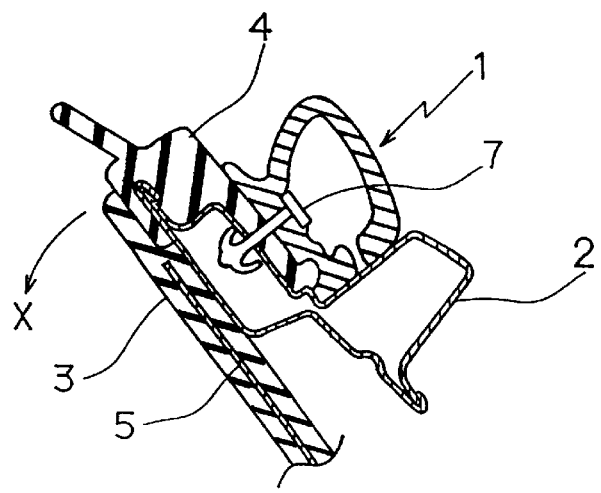
FIG. 6 is an enlarged cross-sectional view taken along the line 6—6 in FIG. 5
Figure 7:
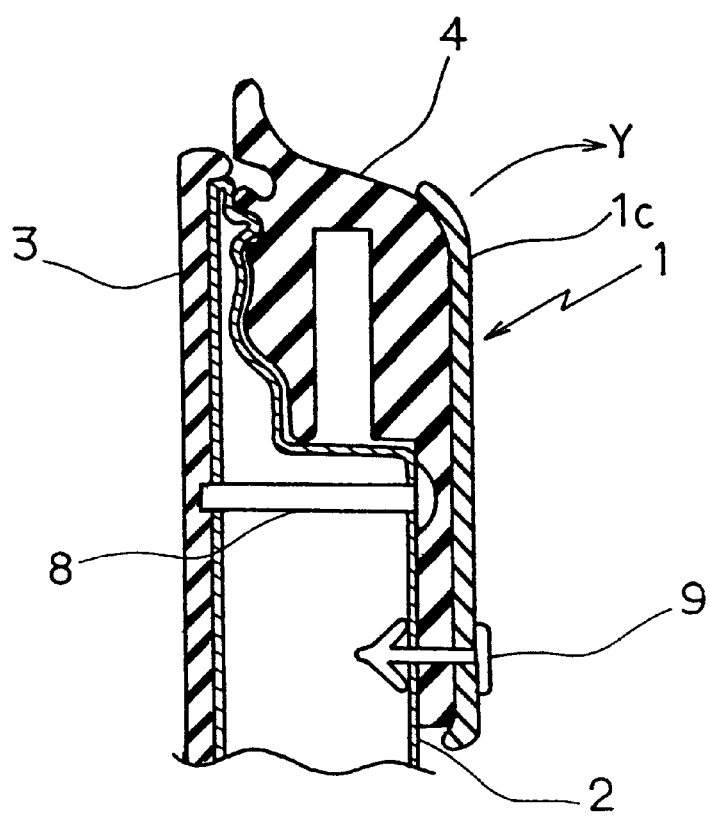
FIG. 7 is an enlarged cross-sectional view showing a structure for positioning weather strips according to another conventional example, which corresponds to the enlarged cross-sectional view taken along the line 7—7 in FIG. 5.

With reference to FIG. 1 through FIG. 4, a description is given of a structure for positioning weather strips according to the preferred embodiment of the invention. FIG. 1 is a perspective view showing a structure for positioning weather strips according to the preferred embodiment. FIG. 2 is an enlarged cross-sectional view taken along the line 2—2 in FIG. 1, FIG. 3 is an enlarged cross-sectional view taken along the line 3—3 in FIG. 1 and FIG. 4 is an enlarged cross-sectional view taken along the line 4—4 in FIG. 1.

A structure for positioning weather strips according to the preferred embodiment of the invention is such that a roughly L-shaped weather strip 11, for in which a seal portion 11a resiliently contacting a door (not illustrated) is intergrally formed, is inserted into and attached to a sash 12 which is located at the periphery of an opening of the vehicle body, a single garnish 13 in which no insert metal member 5 is internally incorporated is fixed at the sash 12 at a position corresponding to the side S of the weather strip 11, a subseal 14 is attached to the sash 12 at a position corresponding to the upper face U of the weather strip 11 in such a state where the same is in contact with the weather strip 11, and simultaneously the weather strip 11 is fixed by a clip 20 at the subseal 14 at a more position than the fixing position of the garnish 13. The clip 20 passes through the hole 21 in the subseal 14 and through a hole 22 in the weather strip 11.

The weather strip 11 comprises a hollow seal portion 11a, an attaching base portion 11b attached to the sash 12, and an appearance lip portion 11c formed to be integral therewith, and a plate-like garnish 13 is fixed on the rear surface of the sash 12 corresponding to the vertical portion (side portions) of the roughly L-shaped weather strip 11 via a fixing screw 16 (FIG. 2). One end side of the subseal 14 is attached to the surface of the sash 12 corresponding to the upper face of the horizontal portion of the roughly L-shaped weather strip 11 in such a state where the same is in contact with the appearance lip 11c of the weather strip 11. Furthermore, the subseal 14 may be integral with a roof side subseal or may be separated therefrom.

The structure for positioning weather strips according to the preferred embodiment is greatly different from a structure for positioning weather strips according to any one of the conventional examples in view of:

(1) The garnish 13 is a single piece, in which no insert metal member 5 similar to that in the conventional examples is internally incorporated.

(2) The weather strip 11 is fixed at the subseal 14 by a clip 20 with no sash 12 intervened between the weather strip 11 or subseal 14 and the clip 20.

(3) The fixing position of the weather strip 11 at a more upper position than the position where the garnish 13 is fixed at the sash 12 by a fixing screw 16.

(4) The length of the weather strip 11 and subseal 14 at the portion can be made shorter, resulting from the fixing position thereof being determined at an upper position.

With the invention, since the fixing position of the weather strip 11 and subseal 14 is not determined at a lower position than the fixing position of the garnish 13 but is determined at an upper portion, it is possible to prevent the upper ends of the weather strips 11 from protruding or flapping even though no insert metal member 5 is provided in the garnish 13, and it is effective to prevent the weather strips 11 from slipping because the fixing position is an upper position.

Since the downsizing of metal dies can be secured equivalent to a shortening of the length of the weather strip 11 and subseal 14, the total production cost can be decreased in line without requiring use of the above-mentioned insert metal member 5.

Furthermore, the subseal 14 is made of solid rubber and is a die-molded member. The subseal 14 comprises an attaching face 14a having a clip hole 22 provided therein in which a clip 20 may be inserted for the weather strip 11. The adhesivity between the clip 20 and subseal 14 is increased to improve the adhesivity between the subseal 14 and a weather strip 11 to be attached thereto. Still furthermore, it is possible to prevent the weather strip from slipping. In addition it is possible to keep the thickness (t') (FIG. 2) around the clip hole larger than an appointed thickness (t) at the clip hole for example, larger than 5 mm, so that the rigidity of the subseal 14 can be much increased.

With the invention, the fixing position between the weather strip and subseal is not determined at a lower position than the fixing position of the garnish but may be determined at an upper position. Therefore, with a single garnish in which no insert metal member is internally incorporated, it is possible to prevent the upper end of the weather strip from protruding and flapping and to prevent the appearance from being worsened. Furthermore, since the fixing position is determined at an upper position, the structure of the invention is very effective to prevent the weather strip from slipping.

Furthermore, in the conventional examples, since the fixing position between the weather strip and subseal was at a lower position than the fixing position of the garnish, along length of weather strip and subseal, was conventionally necessary for this portion. According to the structure of the invention, this is not required anymore. That is, since the length can be shortened, the metal dies can be made small-sized equivalent to the shortening of the length, and the total production cost can be decreased in line with the downsizing of the metal dies. The molding thereof can thereby be facilitated by the downsizing of metal dies.

With the invention, in addition to the above effect and advantages, since the attaching face of a fixing clip of the weather strip is formed, the adhesivity of the clip and subseal can be increased, and the adhesivity of the subseal and a weather strip to be attached to the subseal is further increased. Furthermore, it is possible to prevent the weather strip from slipping. Since the thickness around the clip hole can be kept thicker than an appointed thickness, the rigidity of the subseal can also be increased.

What is claimed is:

1. A structure for positioning weather strips, comprising:
   a roughly L-shaped weather strip having a seal portion adapted to resiliently contact a door, said seal portion being joined to said weather strip to form a single piece, and said weather strip being inserted into and attached to a sash which is adapted to be located at a periphery of an opening of a vehicle body, a single garnish in which no insert metal is internally incorporated, said single garnish being fixed to said sash only at a position corresponding to a side of said vehicle opening and a side of said weather strip, said garnish being so fixed to said sash at the upper portion of said garnish and near the top of said vehicle opening by a connector, a subseal attached to said sash at a position corresponding to a top of said vehicle opening and attached to an upper face of said weather strip such that said subseal is attached in direct contact with said weather strip, said weather strip having an attaching base portion and an appearance lip portion integrally formed with said attaching base portion, said appearance lip portion having an upper corner portion which is fixedly connected directly to said subseal by a clip, whereby said subseal is interposed between said sash and said weather strip, and said clip passing from the outside through only said appearance lip portion of said weather strip and said subseal for fixing said weather strip to said subseal at a more upper position than the fixing position of said garnish to said sash.

2. The structure for positioning weather strips as set forth in claim 1, wherein said subseal comprises an attaching portion having a clip hole provided therein for accommodating the clip, said clip hole extending through said attaching portion of said subseal through a given thickness, and wherein a thickness of said attaching portion around and spaced from said clip hole is larger than said given thickness.

3. The structure for positioning weather strips as set forth in claim 1, wherein said subseal is a die-molded member made of solid rubber.

4. The structure for positioning weather strips as set forth in claim 2, wherein said subseal is a die-molded member made of solid rubber.

* * * * *